United States Patent [19]

Schaefer

[11] 4,429,964

[45] Feb. 7, 1984

[54] MIRROR-REFLEX CAMERA WITH ELECTRONIC RANGEFINDER

[75] Inventor: K. Dieter Schaefer, Braunfels, Fed. Rep. of Germany

[73] Assignee: Ernst Leitz Wetzlar GmbH, Wetzlar, Fed. Rep. of Germany

[21] Appl. No.: 320,075

[22] Filed: Nov. 10, 1981

[30] Foreign Application Priority Data

Dec. 15, 1980 [DE] Fed. Rep. of Germany ....... 3047184

[51] Int. Cl.³ ............................................... G03B 3/00
[52] U.S. Cl. ......................................... 354/25; 354/59
[58] Field of Search .......................................... 354/25

[56] References Cited

U.S. PATENT DOCUMENTS

| | | | |
|---|---|---|---|
| 3,781,110 | 12/1973 | Leitz et al. | 356/4 |
| 3,953,728 | 4/1976 | Leitz et al. | 250/201 |
| 4,110,042 | 8/1978 | Leitz | 356/4 |
| 4,188,102 | 2/1980 | Schaefer | 354/25 |
| 4,200,786 | 4/1980 | Holle | 250/204 |

OTHER PUBLICATIONS

OPTIK by H. Haferkorn (1981), published by Harri Deutsch, Frankfurt/M., W. Germany, pp. 475–477.

*Primary Examiner*—Michael L. Gellner
*Attorney, Agent, or Firm*—Wells & Wells

[57] ABSTRACT

A mirror relex camera having a single objective and a horizontal optical axis passing through the objective. A viewer system consisting of a focusing screen, a field lens, a pentaprism and an eyepiece is located sequentially along the optical axis. A fully specular concave mirror ground on the lower edge of the exit surface of the pentaprism projects an image of an object to be photographed from the picture-taking objective of the mirror reflex camera through the pentaprism onto a grating acting as a spatial frequency filter which is followed by a photoelectric detector system. The grating is located in the focal plane of the concave mirror. An optical wedge (13) defining a measuring spot of the viewer is provided in the plane of the focusing screen and deflects one part (14) of the viewer beam so that in the vicinity of the eyepiece (6) of the viewer (in the vicinity of the concave mirror (7c) two mutually vertically offset and overlapping pupil images (AP', AP") are generated. The first pupil image (AP') is central with respect to the eyepiece (6) sight and is generated by the object field light, while the second pupil image (AP") is generated by the measuring spot light.

3 Claims, 3 Drawing Figures

MIRROR-REFLEX CAMERA WITH ELECTRONIC RANGEFINDER

CROSS-REFERENCE TO RELATED APPLICATION

Applicant claims priority under 35 USC 119 for application P 30 47 184.2, filed Dec. 15, 1980 in the Patent Office of the Federal Republic of Germany.

BACKGROUND OF THE INVENTION

The field of the invention is reflex cameras and the invention is particularly concerned with improvements in the electronic rangefinders therefor. These rangefinders have a photoelectric detection system mounted behind a grating acting as a spatial frequency filter in a focusing plane of the image taking objective and the output signals from the detection system provide information about the degree of focus of the objective on the object being aimed at.

The state of the art of such reflex cameras may be ascertained by reference to U.S. Pat. Nos. 3,781,110; 3,953,728 and 4,188,102; the disclosures of which are incorporated herein.

An essential feature of these rangefinders as disclosed in U.S. Pat. No. 4,188,102 is a mirror ground on the lower edge of the pentaprism of the camera and the angles of the pentaprism are selected so that the viewfinder axis deviates downward by some angle with respect to the optical axis. For normal camera use the optical axis is horizontal. Moreover, the eyepiece is upwardly offset with respect to its position when the optical axis is horizontal and is slanted so that the eyepiece and viewfinder axes subtend an angle.

This inclination of the optical axis for the viewfinder sight on the one hand and the measuring beam on the other hand, however, suffers from the drawback that the angular changes then required at the pentaprism result in undesired reflections in the viewfinder image. Also, when objectives of long focal lengths and lesser light admission are used, the exit pupil of which is well known to be smaller than the eyepiece window, a bothersome darkening of the viewer image takes place. Again, it has been found that the mutual tilting of the two beams is required merely for the light flux passing through the "measurement spot" but not for the light flux from the object field.

SUMMARY OF THE INVENTION

Having in mind the limitations of the prior art it is an object of the present invention to arrange a beam division between the beam to the eyepiece and the beam to the photoelectric detector in a mirror reflex camera with an electronic rangefinder, where for a symmetric utilization of the objective pupil only the light flux passing through the measuring spot is deflected for generating an image of the objective exit pupil which is offset vertically from the one generated in the eyepiece plane.

This object is achieved for a mirror reflex camera having an electronic rangefinder by an optical means defining a measuring spot provided in the plane of the focusing screen of the viewer, this optical means deflecting part of the viewer beam so that two mutually overlapping and offset pupil images are generated in the vicinity of the eyepiece of the viewer and in the vicinity of the concave mirror respectively. One of these images is located centrally with respect to the eyepiece sight, while the other is produced by the light from the measurement spot.

BRIEF DESCRIPTION OF THE DRAWING

The drawings show the invention in schematic manner in relation to an embodiment which is described in further detail below.

DESCRIPTION OF THE PREFERRED EMBODIMENT

Figure 1:
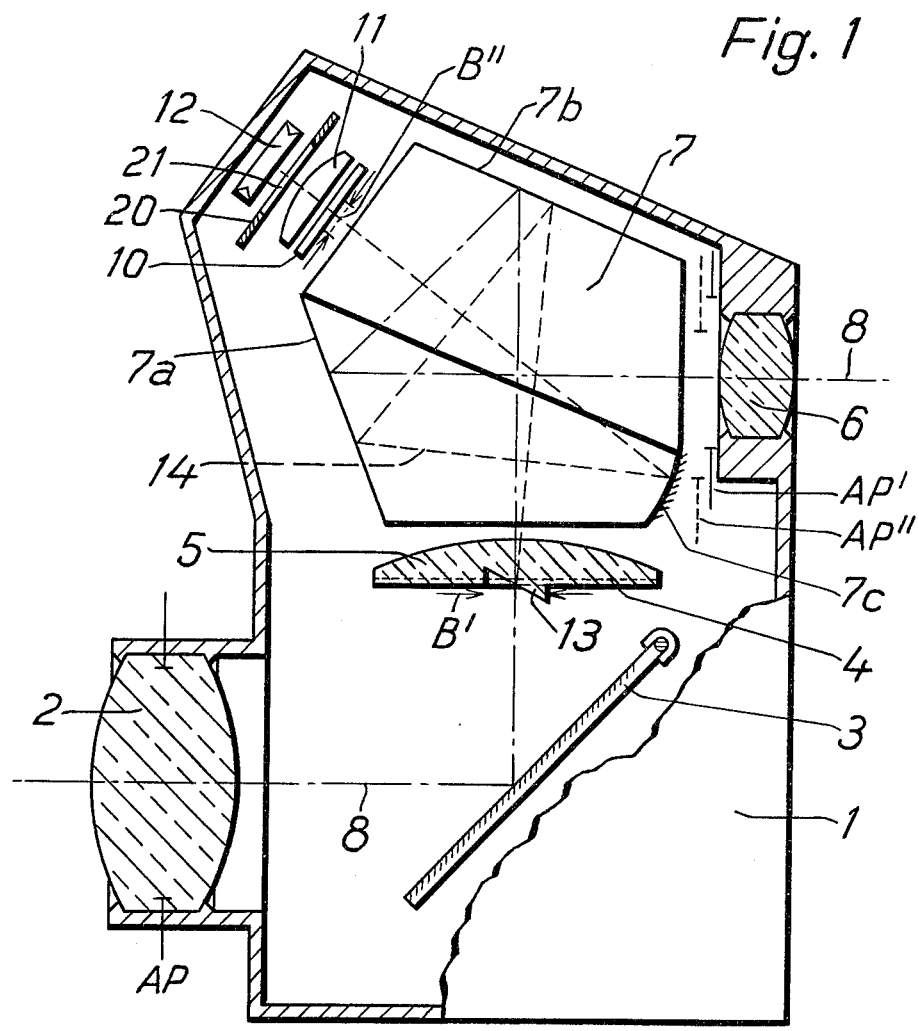
FIG. 1 is a schematic showing in cross-section of a mirror reflex camera with optical means conforming to the design of the invention and arranged to deflect part of the viewer beam.

With particular reference to FIG. 1, there is shown the housing 1 of a mirror reflex camera which has an objective 2 and a reflex mirror 3. Above the reflex mirror is located a focusing screen 4 integral with a field lens 5. An image B' of an object (omitted) is generated by means of the objective 2 on the focusing screen 4.

This image B' is observed by the camera user by means of an eyepiece 6 acting as a magnifier and through a pentaprism 7. The pentaprism dimensions are selected so that the optical axis 8 of the objective 2, following a two-fold deflection at the reflecting surfaces 7b and 7a in the pentaprism 7, exits backward out of the camera housing 1 parallel to its path in the objective 2. That part of the beam which passes through the pentaprism between the objective 2 and the eyepiece 6 is also called the viewer beam. In the drawing, the viewer beam and optical axis 8 are shown in dot-dash lines.

The camera shown is furthermore provided with an electronic rangefinder of which the essential components are the objective 2, a grating 10 acting as a spatial frequency filter and mounted in a plane conjugate to the image plane of the objective 2, a field lens 11 following the grating 10 and a photoelectric detector system 12. The operation of such a rangefinder is not significant for the present invention and is described, for instance, in U.S. Pat. Nos. 2,781,110 and 3,953,728 in great detail. It is necessary that the image B' of the object be projected onto the grating 10. Since, as described above, the image B' also should be simultaneously visible in the eyepiece 6, it is necessary to divide the beam leaving the image B'. This is accomplished in the present invention by means of a geometric beam splitter, that is, by splitting the exit pupil AP of the objective 2.

For that purpose, a clear-glass optical wedge 13 defining a measuring spot is arranged at the center and in the plane of the focusing screen 4. This wedge generates an image AP" which is vertically offset with respect to an image AP' of the exit pupil AP of the objective 2 being projected by the field lens 5 into the eyepiece plane and centrally to the eyepiece 6. This means that a partial beam 14 shown in dashed lines is split off the viewer beam distinguished by the optical axis 8. Therefore following the reflection of this partial beam 14 on the surface 7b and 7a and on a concave mirror 7c of the pentaprism 7 the field lens 5 generates an image B" of the omitted object on the grating 10.

As the concave mirror reflects not only the light flux from the partial pupil belonging to the measuring spot and "tilted" by the wedge angle onto the photoelectric detector system 12, but also simultaneously reflects a light flux from the object field which is not desired in rangefinding, the latter light flux must be stopped, for instance, by a mask located in front of the photoelectric detector system 12. This mask 20 and the use thereof is disclosed in U.S. Pat. No. 4,110,042, Figs. 4, 4a and 4b.

The advantage of this novel mirror reflex camera is not only that the pentaprism used is manufactured in a relatively simple manner, but most of all applies when long-focus, low apertured objectives are used, wherein the exit pupil is smaller than the eyepiece window. As the exit pupil is imaged to be central to the ocular sight, there is no troublesome darkening of the viewer image. At most, only the central measuring spot may be darkened. By skillfully selecting the wedge angle affecting one part of the viewer beam, this drawback also can be averted down to an f/number as low as 1/4.

BEST MODE OF CARRYING OUT THE INVENTION

In the best mode of carrying out the invention the wedge 13 selected has the designation and characteristics as follows:

A prism having two refracting surfaces is designated as optical wedge. Such a wedge is able to realize a small deflection in a light beam (see Haferkorn OPTIK Physikalisch-technische Grundlagen und Anwendugen, Chapter 5.5.5, page 475–477).

Figure 2:
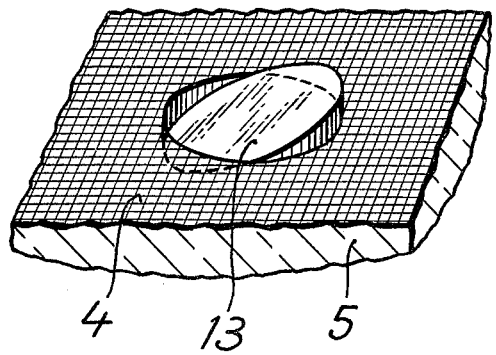
FIG. 2 is a detailed showing of the wedge 13 of FIG. 1.

For accomplishing a beam splitting and for defining the measuring spot, as described herein before, a suitable recess is provided in the plane of the focussing screen 4 wherein wedge 13 is fixedly fitted (FIG. 2). A cementation of wedge 13 onto the plane of focussing screen 4 is possible also. On a corresponding orientation of wedge 13 within the plane of the focussing screen 4, it will create the image AP" vertically offset with respect to the image AP' of the exit pupil of objective 2 (see right hand upper side of FIG. 1).

The mask 20 used with this wedge has the designation and characteristics as follows.

The mask is an apertured stop and is preferably constructed as a circular disk. Stops are generally used for fading out light flux and are thus defining on the one hand the brightness of an image and on the other hand the magnitude of the field of view.

Figure 3:
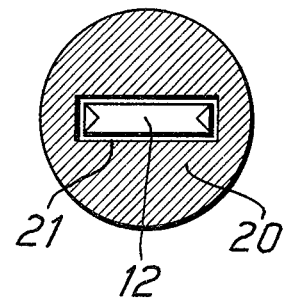
FIG. 3 is a detailed showing of mask 20 of FIG. 1.

Though the stop in U.S. Pat. No. 4,110,042 is used for determining the pupil centers of gravity, in the present invention it is suitable for masking off light flux undesired for rangefinding. The mask 20 as shown in FIG. 3 is furnished with an aperture the form of which is preferable in accordance with the outer form of the photoelectric detector system 12. In the case shown, the aperture 21 is rectangular and only light flux passing the measuring spot defined by wedge 13 in the plane of focussing screen 4 and essential for rangefinding is transmitted to the photo-electric detector system 12.

I claim:
1. A mirror reflex camera comprising:
   (a) a picture taking objective having a horizontal optical axis and an object image projected by said picture taking objective;
   (b) a grating acting as a spatial frequency filter;
   (c) an electronic rangefinder including a photoelectric detection system;
   (d) a viewer system located along said optical axis comprising in series a focusing screen having a plane, a field lens, a pentaprism and an eyepiece, said optical axis being offset in parallel from its original path by two reflections in said pentaprism and exiting said eyepiece;
   (e) mirror means comprising a fully specular concave mirror (7c) provided at the lower edge of the exit surface of said pentaprism (7) and having a focal plane; and
   (f) means (13) defining a measuring spot in said plane for optically deflecting a first portion (14) and a second portion (8) of said object image; in the vicinity of said eyepiece (6) and in the vicinity of said concave mirror (7c), first and second mutually vertically offset and overlapping pupil images (AP', AP") are generated by said first and second portions, said first pupil image (AP') being central with respect to said eyepiece (6) and generated by said second portion, while said second pupil image (AP") is generated by said first portion.

2. The mirror reflex camera of claim 4, wherein said means 13 is a clear-glass optical wedge.

3. The mirror reflex camera of claim 2, wherein said optical wedge has an angle sufficient to project the upper half of said first pupil image onto said eyepiece while the lower half of said second pupil image is incident on said concave mirror and is reflected onto said grating 10.

* * * * *